United States Patent
Sarkar

(10) Patent No.: US 8,619,636 B1
(45) Date of Patent: Dec. 31, 2013

(54) METHODS AND SYSTEMS FOR CREATING OPTIMIZED TRANSMISSION PATHS FOR VOIP CONFERENCE CALLS

(75) Inventor: Falguni Sarkar, Redmond, WA (US)

(73) Assignee: AT&T Mobility II LLC, Atlanta, GA (US)

( * ) Notice: Subject to any disclaimer, the term of this patent is extended or adjusted under 35 U.S.C. 154(b) by 1138 days.

(21) Appl. No.: 11/381,365

(22) Filed: May 3, 2006

(51) Int. Cl.
- *H04L 12/16* (2006.01)
- *H04Q 11/00* (2006.01)
- *H04L 12/26* (2006.01)
- *H04L 1/00* (2006.01)
- *H04L 12/28* (2006.01)

(52) U.S. Cl.
USPC ........ 370/260; 370/230.1; 370/352; 370/356; 370/401; 379/205.01; 709/204; 709/223

(58) Field of Classification Search
USPC ............... 370/230.1, 352, 356, 401; 709/204, 709/223; 379/205.01
See application file for complete search history.

(56) References Cited

U.S. PATENT DOCUMENTS

| | | | |
|---|---|---|---|
| 6,614,781 B1 * | 9/2003 | Elliott et al. | 370/352 |
| 6,937,597 B1 * | 8/2005 | Rosenberg et al. | 370/356 |
| 6,944,166 B1 * | 9/2005 | Perinpanathan et al. | 370/401 |
| 7,158,627 B1 * | 1/2007 | Lu | 379/221.07 |
| 7,170,863 B1 * | 1/2007 | Denman et al. | 370/260 |
| 7,227,927 B1 * | 6/2007 | Benedyk et al. | 379/9.05 |
| 2002/0071429 A1 * | 6/2002 | Donovan | 370/352 |
| 2002/0076025 A1 * | 6/2002 | Liversidge et al. | 379/202.01 |
| 2003/0059015 A1 * | 3/2003 | Eber et al. | 379/201.02 |
| 2004/0047339 A1 * | 3/2004 | Wang et al. | 370/352 |
| 2005/0083941 A1 * | 4/2005 | Florkey et al. | 370/395.2 |
| 2006/0034266 A1 * | 2/2006 | Harris et al. | 370/356 |
| 2006/0077989 A1 * | 4/2006 | Lu et al. | 370/401 |
| 2006/0244818 A1 * | 11/2006 | Majors et al. | 348/14.08 |
| 2007/0058795 A1 * | 3/2007 | Arrant et al. | 379/202.01 |
| 2007/0208806 A1 * | 9/2007 | Mordecai et al. | 709/204 |
| 2007/0280464 A1 * | 12/2007 | Hughes et al. | 379/205.01 |

* cited by examiner

*Primary Examiner* — Hassan Phillips
*Assistant Examiner* — Lonnie Sweet
(74) *Attorney, Agent, or Firm* — Parks IP Law LLC; Jennifer P. Medlin, Esq.

(57) ABSTRACT

A system, method, and apparatus for providing bandwidth efficient voice over internet protocol conference calls is disclosed. The system uses softswitches, also known as media gateway controllers, that can track active calls by recording information regarding those calls in the memory of the softswitches. Upon receipt of an instruction, at a softswitch, to issue an invitation to another party to join an existing call, the softswitch examines its table of call information to determine if the invitation should be issued from that softswitch or forwarded to another softswitch involved in the existing call. In this manner, the invitation can be issued by a softswitch involved in the existing call that is nearer to the invited party than would be the case with prior art methods. This avoids the transmission of redundant data and conserves bandwidth.

12 Claims, 8 Drawing Sheets

METHODS AND SYSTEMS FOR CREATING OPTIMIZED TRANSMISSION PATHS FOR VOIP CONFERENCE CALLS

TECHNICAL FIELD

This invention relates generally to telecommunications. More specifically it relates to the field of providing conference calling services over a packet switched network.

BACKGROUND OF THE INVENTION

The Internet has evolved from an obscure network interconnecting various Department of Defense installations, to a network for universities to share information, and on to the global publicly accessible network that it has become. As it has evolved so have the services that are provided using its interconnected structure of computer systems, network links, and routers.

Of these services, Voice over Internet Protocol or VoIP has emerged as a current and future competitor of traditional circuit switched telephone networks. VoIP found early acceptance in enterprise environments where VoIP allows for the installation costs associated with building both a circuit based telephony infrastructure and a data infrastructure to be avoided. Using VoIP businesses can instead choose to use an IP based network to transfer both voice and data.

In many instances, the cost of service can be substantially less than paying for traditional business telephony service. VoIP can provide the advanced features of a traditional business telephone network, such as call transferring, call forwarding, voice mail, caller ID, and conferencing abilities, among others, many times at a lower cost than similar circuit switched based alternatives.

Residential VoIP is currently available as well and is gaining prevalence as a telephone access alternative for customers that have a broadband internet connection.

As the VoIP user base grows, the network bandwidth consumed transporting VoIP calls will increase. The more prevalent VoIP becomes, the importance of ensuring that VoIP calls are structured to maximize bandwidth efficiency grows. This is needed in order to prevent network congestion, ensure quality of service, and realize the cost benefits of VoIP now and in the future.

Current methods and systems of providing conferencing services via VoIP can often result in wasted bandwidth in the form of transmitting redundant data between infrastructure elements.

SUMMARY OF THE INVENTION

The various embodiments of the present invention overcome the shortcomings of the prior art by providing a system, method, and apparatus for providing voice over internet protocol conference calls which reduce the transmission of redundant data.

One aspect of the present invention is an apparatus. The apparatus can include a softswitch for processing voice over internet protocol conference calls including a processor, a computer readable memory, and a data interface. The processor can be configured to store call information in the computer readable memory, and read the memory to determine if conference invitations should be issued by the softswitch or forwarded.

Another aspect of the present invention is a system. The system can include a first softswitch and a second softswitch, where the first softswitch has a table stored in memory. The table is used for tracking active calls being serviced by the softswitch. The first softswitch can be configured to check the table to determine if an invitation to add another party to an existing call should be issued by that softswitch or forwarded to another softswitch.

Another aspect of the present invention is a method of providing voice over internet protocol conference calls. The method can include storing active call information in a computer readable memory, where the call information corresponds to an active call being serviced by a first softswitch. Upon receipt of an instruction to invite another party into an existing call, the method can include determining whether an invitation should be issued by the first softswitch or if the instruction to invite another party should instead be forwarded to a second softswitch, where the determination is based on the active call information stored in the computer readable memory.

The foregoing has broadly outlined some of the aspects and features of the present invention, which should be construed to be merely illustrative of various potential applications of the invention. Other beneficial results can be obtained by applying the disclosed information in a different manner or by combining various aspects of the disclosed embodiments. Accordingly, other aspects and a more comprehensive understanding of the invention may be obtained by referring to the detailed description of the exemplary embodiments taken in conjunction with the accompanying drawings, in addition to the scope of the invention defined by the claims.

DETAILED DESCRIPTION

Figure 1:
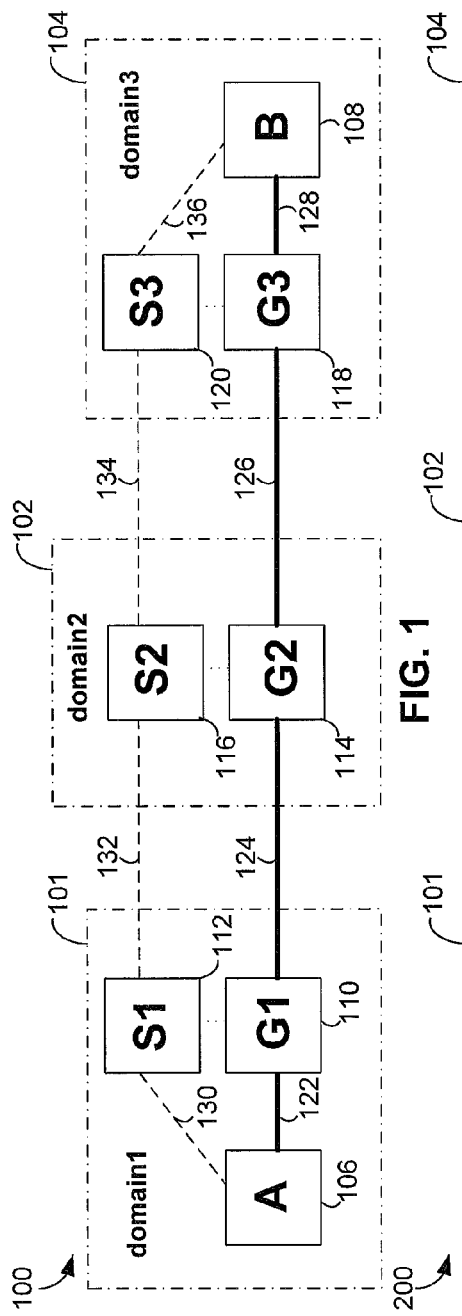
FIG. 1 is a diagram of the structure of a prior art two party VoIP telephone call.

As required, detailed embodiments of the present invention are disclosed herein. It will be understood that the disclosed embodiments are merely examples to illustrate aspects of the invention that may be embodied in various and alternative forms. The figures are not necessarily to scale, and some features may be exaggerated or minimized to show details of particular components. In other instances, well-known materials or methods have not been described in detail to avoid obscuring the present invention. Therefore, specific structural and functional details disclosed herein are not to be interpreted as limiting, but as a basis for the claims and for teaching one skilled in the art to variously employ the present invention.

Referring now to the drawings in which like numerals indicate like elements throughout the several views, the drawings illustrate certain of the various aspects of exemplary embodiments of the invented system and method.

The term softswitch is used herein to describe elements that control the signaling for a VoIP call, such as call set up, maintenance, and tear down. A softswitch is also known in the art as a media gateway controller or a call agent. The systems and methods of the present invention will be described as utilizing Session Initialization Protocol (SIP) as the signaling protocol for the call. It should be understood however, that the present invention can be used with other signaling protocols.

The term gateways is used herein to described elements that handle actual voice traffic, format conversions, and echo corrections as is known in the art.

For simplicity, the calls described herein will be described as occurring wholly within an IP network. As will be apparent to those of skill in the art, the invention is also applicable to VoIP calls where one or more segments of the call are transmitted over a switched telephone network connected to an IP network through the appropriate equipment. The signaling and bearer paths shown are logical paths. The physical paths comprise an IP network.

To better understand the present invention, a prior art VoIP telephone conference call will first be described.

FIG. 1 depicts a prior art VoIP telephone call 100 from user A (or alpha) in domain1 101 to user B (or bravo) in domain3 104. Domain1 101 and domain3 104 can be local exchange carrier (LEC) domains. Signaling paths between elements are indicated by dashed lines while bearer paths are indicated by solid lines. The call passes through domain2 102. Domain2 102 can be an interexchange (IXC) domain. The phone of A 106 is connected to the softswitch S1 112 through signaling path 130 and is connected to gateway G1 110 through bearer path 122. A 106, S1 112, and G1 110 are all located in domain1 101. Softswitch S1 112 is connected to softswitch S2 116 in domain2 102 through signaling path 132. Gateway G1 110 is connected to gateway G2 114 in domain2 102 through bearer path 124. Softswitch S2 116 is connected to softswitch S3 120 in domain3 104 by signaling path 134. Gateway G2 114 is connected to gateway G3 118 in domain3 104 by bearer path 126. The phone of B 108 is connected to S3 120 by signaling path 136 and is connected to G3 118 through bearer path 128.

Figure 2:
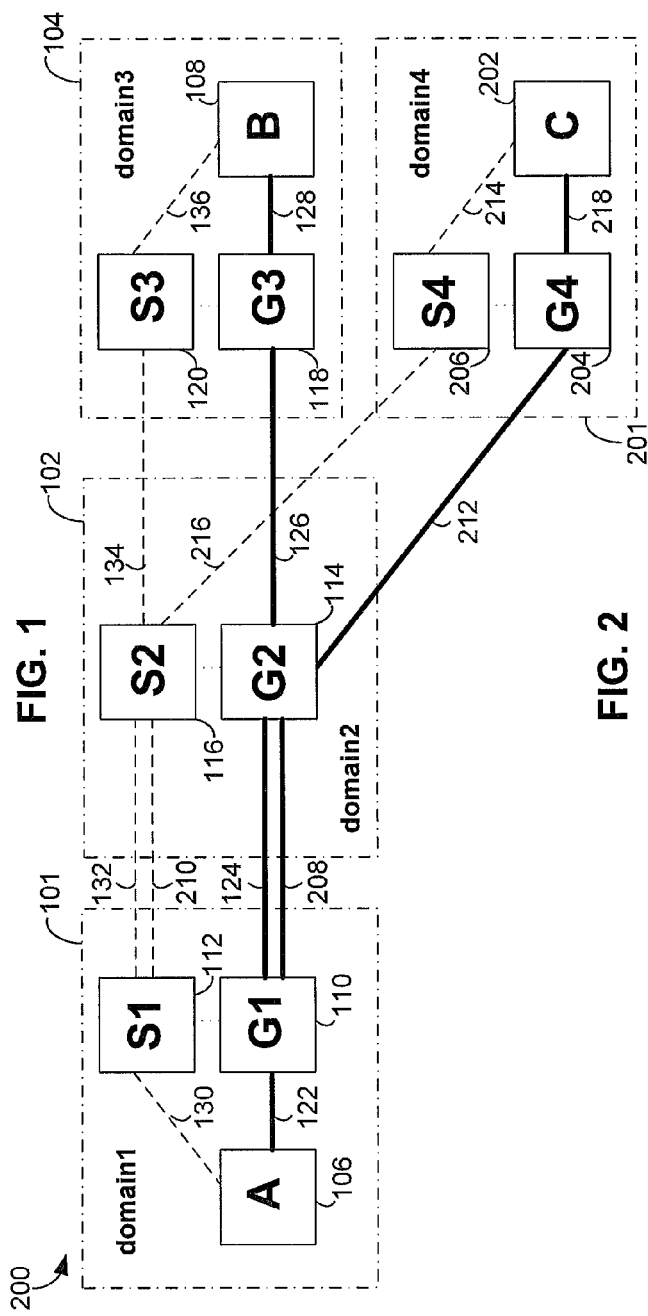
FIG. 2 is a diagram of the structure of a prior art three party VoIP telephone conference call.

FIG. 2 depicts the call 100 of FIG. 1 after user C (or charlie) has been added to the call via a conferencing function resulting in the conference call 200 shown. In the call shown, the conferencing request was initiated by A. This could be accomplished, for example, by A pressing a conferencing button on the phone 106 and dialing C or by choosing C from a menu on the phone 106. The request is received at S1 112. S1 112 can then issues an SIP INVITE message which is forwarded on to the IP network. The INVITE message indicates the invited party through an identifier of the form party@domain. In this case, the INVITE message issued at S1 112 would be for charlie@domain4. Domain4 201 can be a LEC domain. The INVITE message is forwarded from S1 112 to S2 116 and onto S4 206. S4 206 rings C's phone 202. When C answers the phone, an ACK (acknowledge) message is sent from S4 206 to S1 112 via S2 116. S1 112 then instructs G1 110 to open a bearer path to C's phone 202 for carrying VoIP packets. This path comprises bearer paths 208, 212, and 218. Path 208 links G1 110 and G2 114, path 212 links G2 114 and G4 204, and path 218 links G4 204 and C's phone 202.

As can be seen in FIG. 2, there are now two bearer links 124, 208 connecting G1 110 and G2 114. Since the call shown 200 is a conference call, the voice transmissions from A to B and C are identical. A's voice packets are duplicated at G1 110 and sent to B and C via G2 114.

Figure 3:
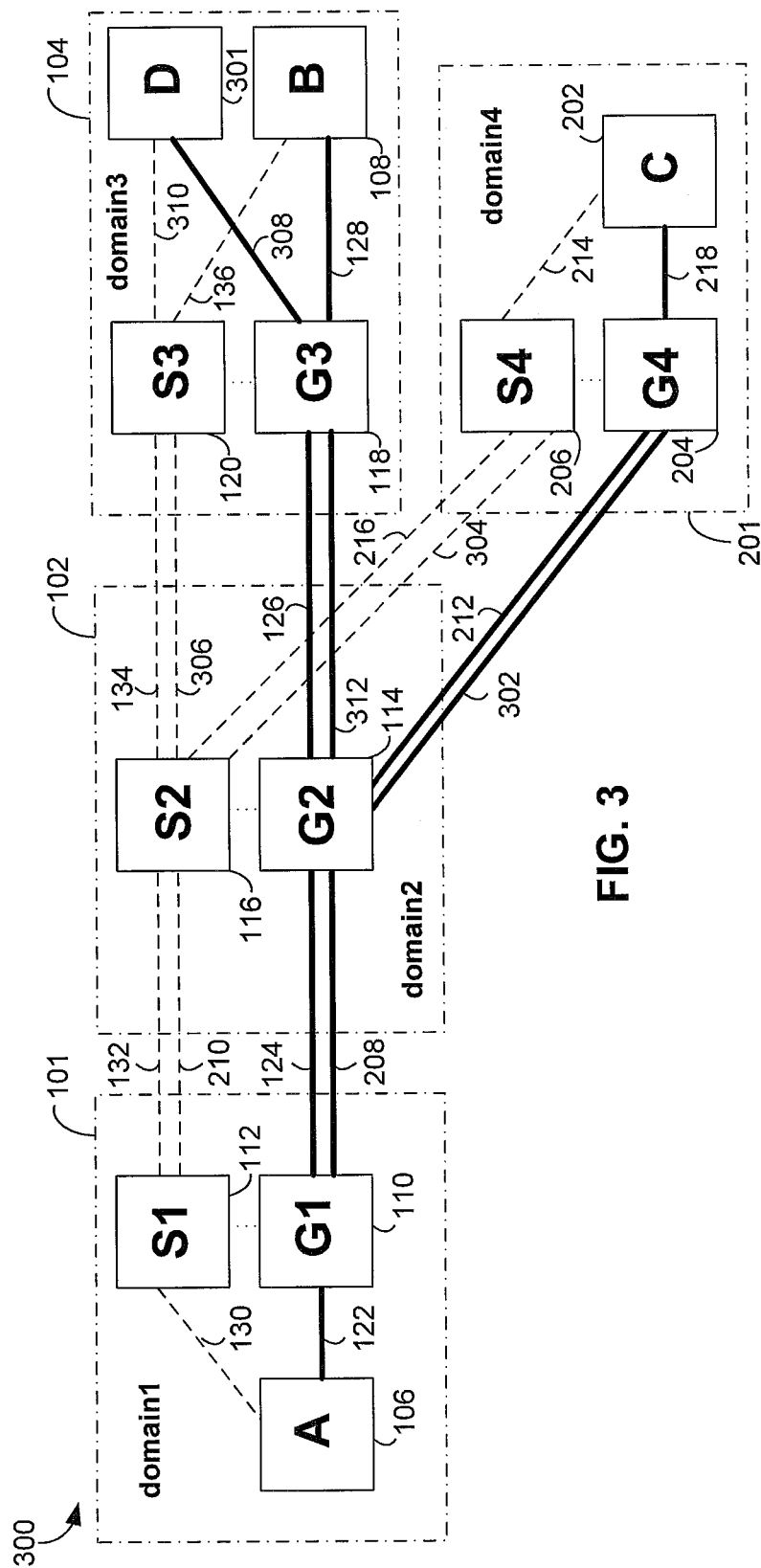
FIG. 3 is a diagram of the structure of a prior art four party VoIP telephone conference call.

FIG. 3 depicts the VoIP conference call 200 of FIG. 2 after user D (or delta) has been added to the call resulting in the conference call 300 shown. In the example shown, C invites D into the conference. C indicates that he wishes to invite D into the call using a conferencing button or other methods known in the art. S4 206 issues an SIP INVITE message to delta@domain3. As described above regarding the conferencing of C into the call, the INVITE message is received at S3 120 via S2 116. S3 120 rings D's phone 301 and sends an ACK message to S4 206 via S2 116 when D answers. S4 206 instructs G4 204 to open a bearer path to G3 118 to handle VoIP packets between C and D.

As can be seen in FIG. 3, there are two bearer paths 212, 302 between G4 204 and G2 114. There are also two bearer paths 126 312 between G2 114 and G3 118. As will be shown, like those described in regard to FIG. 2, these dual paths are redundant and unnecessarily consume extra bandwidth.

Figure 4:
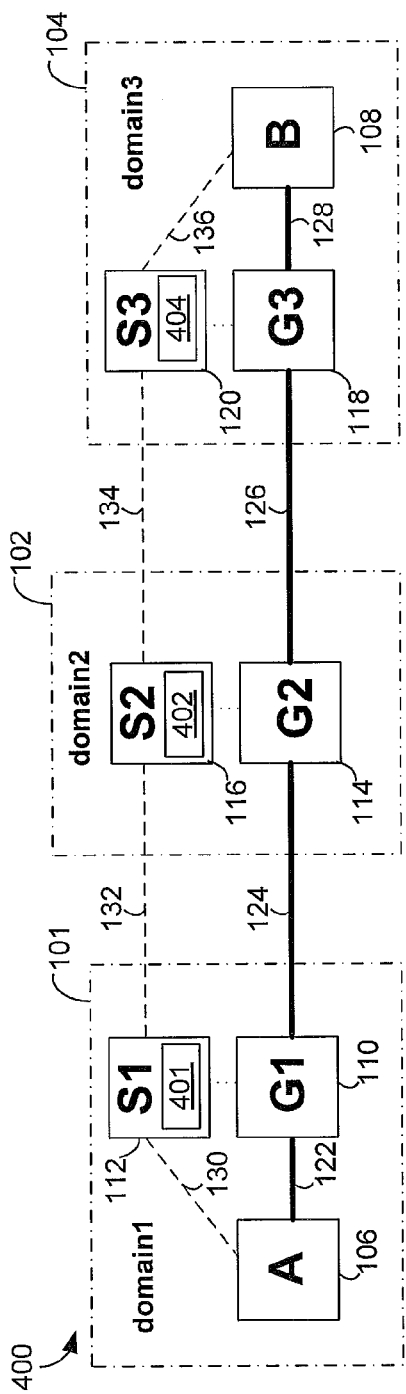
FIG. 4 is a diagram of the structure of a two party VoIP telephone call, according to an embodiment of the present invention.

FIG. 4 shows conference call 400 which is a VoIP telephone call, according to the present invention. The structure of the call is similar to that of FIG. 1 with the exception of the addition of connection tables 401, 402, 404, which are located in computer readable memory of softswitches S1 112, S2 116, and S3 120, respectively. The call 400 has the same bearer and signaling structure as the call 100 shown in FIG. 1, but connection tables 401, 402, and 404 contain connection information regarding calls that are being handled by the respective softswitches. The form/structure of this information will be discussed in detail below.

Likewise, the connection table 402 contains records of information regarding calls that are being handled by softswitch S2 116. The connection table 404 contains records of information regarding calls that are being handled by softswitch S3 120.

Continuing with the example, A decides to invite C (charlie@domain4) into the call. C is located in domain4 201. According to the present invention, instead of immediately issuing an INVITE request, S1 112 can check its connection table 401. From the connection table 401, S1 112 can determine that issuing the invite request from S1 112 and duplicating packets there for transmission to both B and C would needlessly waste bandwidth by sending redundant packets that contain the same content. Instead of issuing the INVITE request, S1 112 forwards the INVITE request to S2 116.

From its connection table 402, S2 116 can determine that there is no closer softswitch in the call to C. Hence, S2 116 can issue the INVITE request and begin duplicating A's content packets in S2 116, one set for transmission to B, one set for transmission to C. C's softswitch S4 206 can have its own connection table 501 for maintaining data regarding calls that are being handled by the softswitch S4 206.

Figure 6:
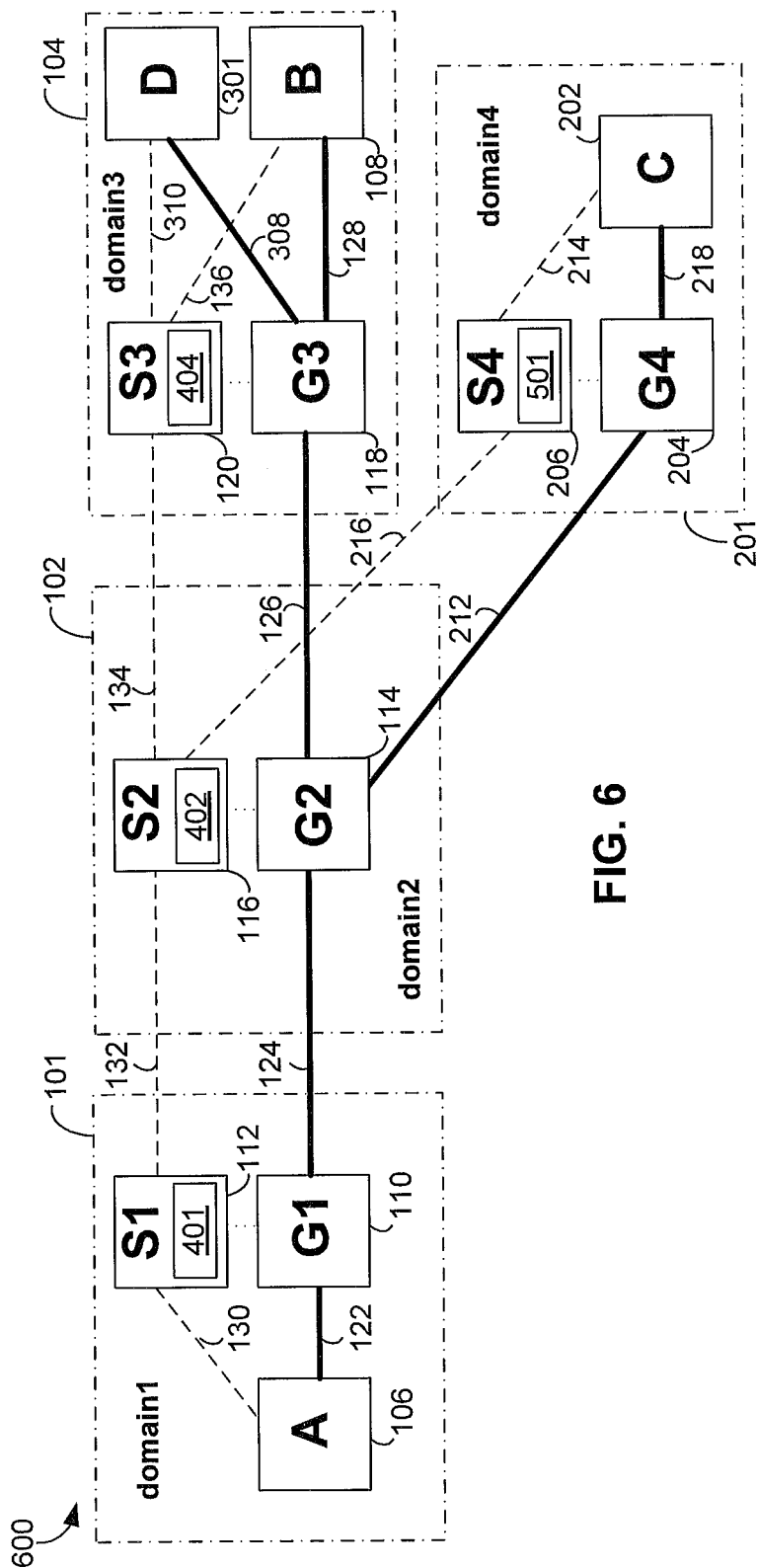
FIG. 6 is a diagram of the structure of a four party VoIP telephone conference call, according to an embodiment of the present invention.

FIG. 6 depicts a conference call following the addition of another party, D (or delta) to the conference call, according to an embodiment of the present invention. In this case, C decides to conference delta@domain3 into the call. Instead of issuing the SIP INVITE request itself, S4 206 examines its connection table 501 to determine that it is not the proper network location for issuing the INVITE request to a party in domain3 104 for maximize bandwidth efficiency according to the present invention. S4 206 instead forwards the INVITE request to S2 116.

S2 116 examines its connection table 402 to determine if it should issue the INVITE request. From the data in the connection table 402, S2 116 can determine that B in domain3 104 is already connected to the call through S3 120 which is located in domain3 104. S2 forwards the INVITE request to S3 120 so that S3 120 can issue the invite request to D 301 and duplicate packets at S3 120 for transmission to B and D.

Comparing FIG. 3 to FIG. 6 will show that the conference call of FIG. 3 has 10 bearer transmission links, while the call of FIG. 6 only requires 7. Thus, the present invention, through intelligent issuance of INVITE requests, reduces bandwidth use for conference calls utilizing a packet network.

To simplify the following discussion, the softswitch and gateway will be treated as a single entity and the discussion will only refer to the softswitch. This combines the signaling and bearer links to further simplify the explanation.

Table 1 below, summarizes the relationships between users, softswitches, and domains for the discussion to follow. Commonly known telecommunications related domains are used in the following example in place of the designations domain1, domain2, etc., used previously.

TABLE 1

| Domain | Softswitch | User | Domain Type | Simplified domain name |
|---|---|---|---|---|
| cingular.com | S1 | A | LEC | c.com |
| att.com | S2 | — | IXC | a.com |
| sprintpcs.com | S3 | B, D | LEC | s.com |
| verizon.com | S4 | C | LEC | v.com |

Softswitch S1 112 is located in the cingular.com domain 101, as is user A using phone 106. Cingular.com is an LEC and will be referred to by the simplified domain name "c.com." Softswitch S2 116 is located in att.com that, for this example, is an interexchange carrier and will be referred to by the simplified domain name "a.com." Softswitch S3 120 is located in sprintpcs.com as are users B and D using phones 108 and 301, respectively. In this example, sprintpcs.com is an LEC and will be referred to by the simplified domain name "s.com." Softswitch S4 206 is located in verizon.com as is user C using phone 202. In this example, verizon.com is an LEC and will be referred to by the simplified domain name "v.com."

Figure 5:
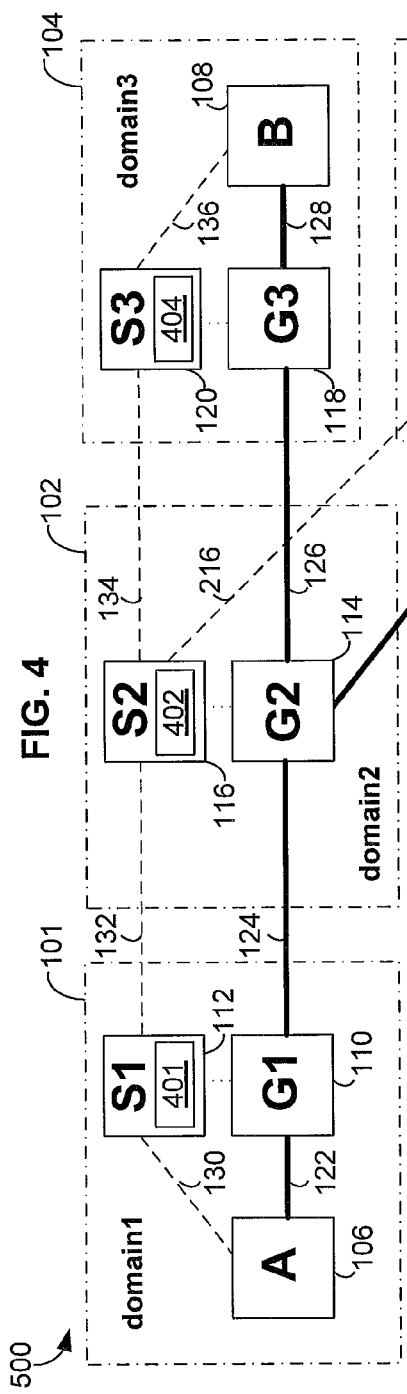
FIG. 5 is a diagram of the structure of a three party VoIP telephone conference call, according to an embodiment of the present invention.

For this example, the sequence of events are similar to those described for FIGS. 4-6. A makes a conference call to B. A then conferences C into the call. C then conferences in D.

Figure 7:
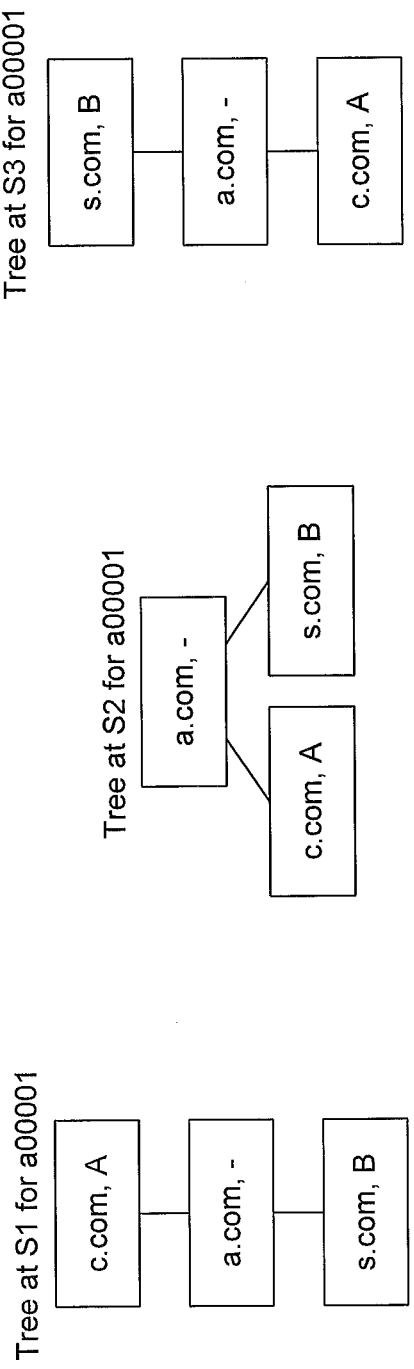
FIG. 7 is a diagram depicting connection trees stored in softswitches involved in a two party VoIP call, according to an embodiment of the present invention.

FIG. 7 shows a logical connection tree diagram for the information that is contained in the connection tables 401, 402, 404 of S1 112, S2 116, and S3 120 for the call established between A and B before C is added to the conference call, as illustrated in FIG. 4.

The call is given an identifier. For this example, the identifier used for the call is "a00001." A softswitch handling multiple calls can have respective connection trees for each call with a different unique ID for each call. Connection trees are updated as new members join the call. The connection trees for a given call can share the same ID across softswitches. Each node in the trees has a domain name and any users within that domain name connected to the call. If a domain is acting as an IXC for the call, then it will not have any users associated with it, this is represented by a "-."

When A initiates the call to B, the softswitch 81 112 determines that B is in another domain. This can be accomplished by analyzing the IP address for B, if given, or through DNS lookup if needed. S1 112 is aware of its own domain and can perform a comparison operation to determine if B is in the same domain. Since B is in another domain, it is necessary to create a connection to B through an IXC. In this case that IXC is a.com. S1 112 creates its own connection tree and then forwards the call origination message to S2 116 in a.com. The origination message can include the call identifier "a00001."

S2 116 receives this request and creates its own tree for call a00001. The call origination message is forwarded to S3 120 in s.com. S3 120 receives the message, and confirms that the intended recipient is in its domain. S3 120 sets up the call with B and returns a call set up complete message to S1 112 via S2 116. At this point the call connection trees for S1 112, S2 116, and S3 120 are in the state illustrated in FIG. 7.

User A then conferences in C located in v.com. S1 112 receives the conference message for the call a00001, and from the IP address for C (given directly to S1 112 by A or resolved using DNS) determines that C is not S1's domain 101. S1 112 checks its call tree for call a00001 to determine if v.com is in the tree. It is not. S1 112 then forwards the conference message to S2 116 in a.com.

S2 116 checks its own tree and determines that v.com is not in the tree. So S2 116 sends a message to S4 206 for setting up the call. While doing so S2 116 also forwards its own call tree for this call to S4 206. S4 206 uses this information to create its own call tree.

Figure 8:
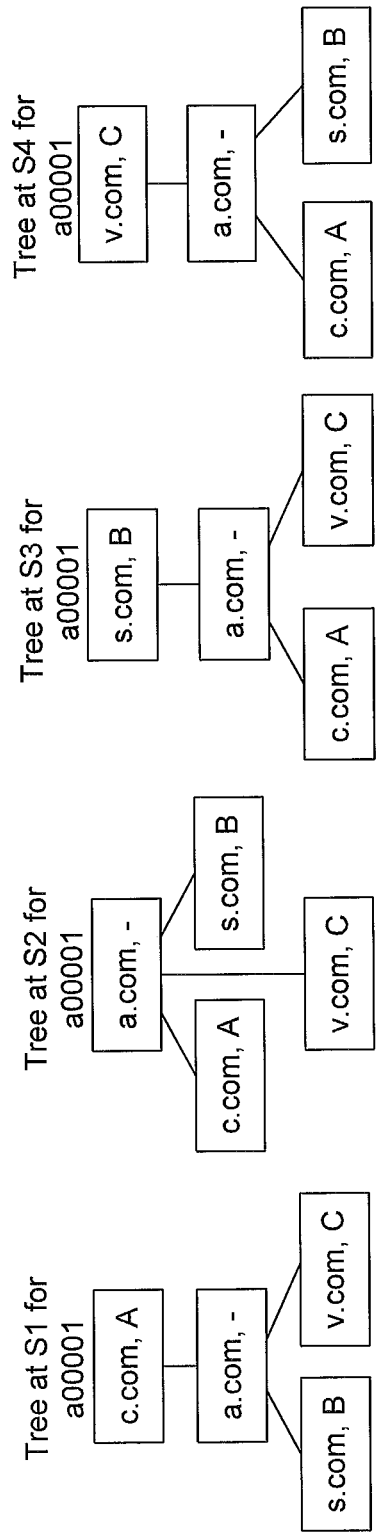
FIG. 8 is a diagram depicting connection trees stored in softswitches involved in a three party VoIP conference call, according to an embodiment of the present invention.

S4 206 creates a tree for itself with root labeled as (v.com, C) and then appends the tree it received from S2 116. S4 206 sets up the call with C and then sends a call set up complete message to S2 116. S2 116 receives the message from S4 206 and broadcasts the new connection information regarding C in v.com through to the softswitches and domains associated with S2's call tree for call a00001. S2 116 adds a new link to a new node (v.com, C) from the root of the tree in its connection tree for call a00001. The other softswitches in the call receive the information from S2 116 and append the new node (v.com, C) to the node (a.com, -) (the node from which the information was received). The connection trees for the call in each of the softswitches for this example are shown in FIG. 8.

Continuing the example, C decides to conference D in s.com into the call. C's softswitch S4 206 receives this information and determines that D is in s.com and it is not in its own domain v.com. S4 206 finds the node that is of type IXC and is at shortest distance from (v.com, C) in its tree (if there is no node of type IXC in the current tree it will create one and connect it to the root). In this case the IXC node in the call is (a.com, -). So the conference message is sent to (a.com, -).

S2 116 in a.com receives the conference message from S4 206 and checks its own connection tree. S2 116 determines that there is already a softswitch in s.com that is involved in the conference call (S3 120). So S2 116 forwards the message to S3 120.

S3 120 determines that user D is in its domain and so S3 120 updates is node (s.com, B) to (s.com, (B,D)). S3 120 sets up the call and sends a confirmation back to S2 116. S2 116 broadcasts the updated connection information to each softswitch connected to it and these softswitches update the node (s.com, B) to (s.com, (B,D)).

Table 2, below, provides an example of how the connection trees of FIG. 7 can be stored as records in a computer readable memory. Table 2 provides examples for connection trees for S1. Application of this storage scheme for other softswitches involved in the call will be apparent to those of skill in the art. The first column entitled "Call/Node ID" comprises the ID of the call with an appended Node identifier. The Node identifier need not be numerical or appear in any order. The Node identifier serves to provide a way of noting which nodes are connected among the various nodes participating in a call. It should be understood that the ID of the call and the Node identifier can be placed in separate columns instead of being appended and placed in the same column.

The second column indicates the domain served by the softswitch for the given node. The third column includes a comma separated list of users participating in the call located the corresponding domain. The fourth column includes a comma separated list of other nodes which are connected to the node represented by the record. The node for c.com, a00001-1, is connected to a00001-2. The node for s.com, a00001-3, is connected to a00001-2 as well. Consistent with those entries, the node for a.com is shown being connected to both a00001-1 and a00001-3.

TABLE 2

| Call/Node ID | Domain | Users | Connected To |
|---|---|---|---|
| a00001-1 | c.com | A | a00001-2 |
| a00001-2 | a.com |  | a00001-1, a00001-3 |
| a00001-3 | s.com | B | a00001-2 |

Table 3, below, provides an example of how the connection trees of FIG. 8 can be stored as records in a computer readable memory. An additional node, a00001-4, has been added to represent the domain v.com of user C who has been conferenced in to the a00001 call. The node a00001-4 is shown connected to a00001-2, and a00001-2 has an additional connection shown in its list to a00001-4.

TABLE 3

| Call/Node ID | Domain | Users | Connected To |
|---|---|---|---|
| a00001-1 | c.com | A | a00001-2 |
| a00001-2 | a.com |  | a00001-1, a00001-3, a00001-4 |
| a00001-3 | s.com | B | a00001-2 |
| a00001-4 | v.com | C | a00001-2 |

Table 4, below, provides an example of how the connection trees of FIG. 9 can be stored as records in a computer readable memory. Since D is in the same domain as B, D is simply added to the user list for node a00001-3.

TABLE 4

| Call/Node ID | Domain | Users | Connected To |
|---|---|---|---|
| a00001-1 | c.com | A | a00001-2 |
| a00001-2 | a.com |  | a00001-1, a00001-3, a00001-4 |
| a00001-3 | s.com | B, D | a00001-2 |
| a00001-4 | v.com | C | a00001-2 |

Figure 9:
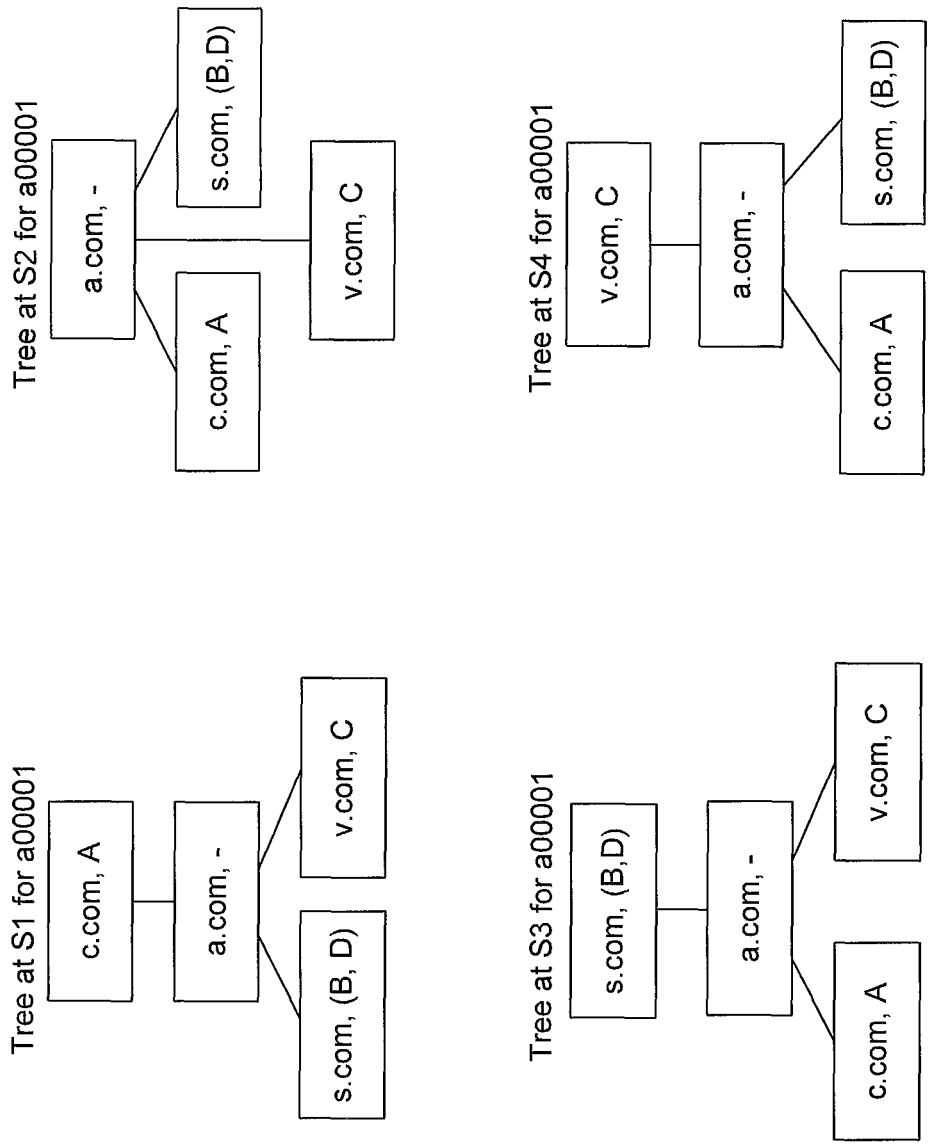
FIG. 9 is a diagram depicting connection trees stored in softswitches involved in a four party VoIP conference call, according to an embodiment of the present invention.

Tables 2-4 show how the connection trees of FIGS. 7-9 can be stored in computer readable memory of the softswitches involved in a conference call, according to the present invention. The softswitch can determine which nodes are connected to it for a given call by first searching for a record in the call which is in the same domain as the softswitch. When a record is located having the same domain as the softswitch, the softswitch can be configured to read the contents of the "connected to" list to get the call/node ID numbers of any nodes connected to it in the call. The softswitch can then check records having these Call/Node IDs to determine how to proceed with INVITE operations, according to the present invention. The list of nodes in the tree can also be used to forward updated connection trees to other nodes participating in a call when needed as described above.

Figure 10:
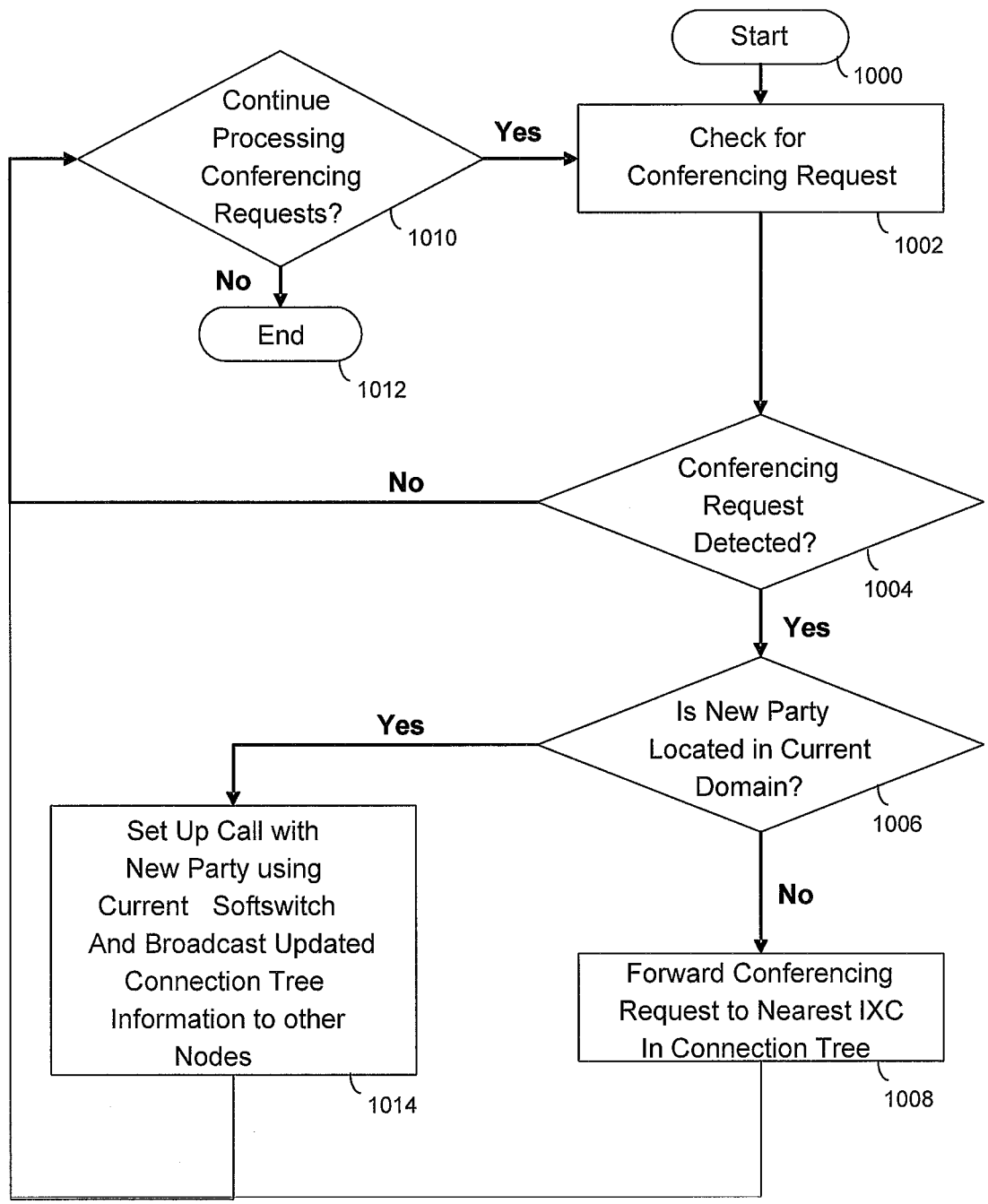
FIG. 10 is a flowchart depicting a method of operation for a softswitch in an local exchange carrier domain, according to an embodiment of the present invention.

FIG. 10 is a flowchart showing a method of operation for a local exchange carrier softswitch involved in a conference call, according to the present invention. The method starts at block 1000 and proceeds to block 1002 where the LEC softswitch checks for a conferencing request either initiated by a user of the softswitch or received from another softswitch. Processing continues to decision block 1004. If a conferencing request is detected operation proceeds to block 1006 where the domain of the new party to be added to the call is checked against the domain of the softswitch to determine if they are in the same domain. If they are not in the same domain processing continues to block 1008 where the conferencing request is forwarded to the nearest interexchange carrier softswitch found in the connection tree for the call. Following block 1008, processing continues to decision block 1010 where the method determines if conferencing requests should continue to be processed. If not, the method ends at terminator 1012. If conferencing request processing should continue, the method returns to block 1002.

Returning now to decision block 1004, if no conferencing request is detected operation proceeds to decision block 1010. Returning to decision block 1006, if the new party is located in the current domain, processing continues to block 1014 where the new party is added to the conference call via the current softswitch and the softswitch broadcasts information to the other softswitches involved in the call for updating the connection tree to show the new party in the call. From block 1014 processing continues to decision block 1010.

Figure 11:
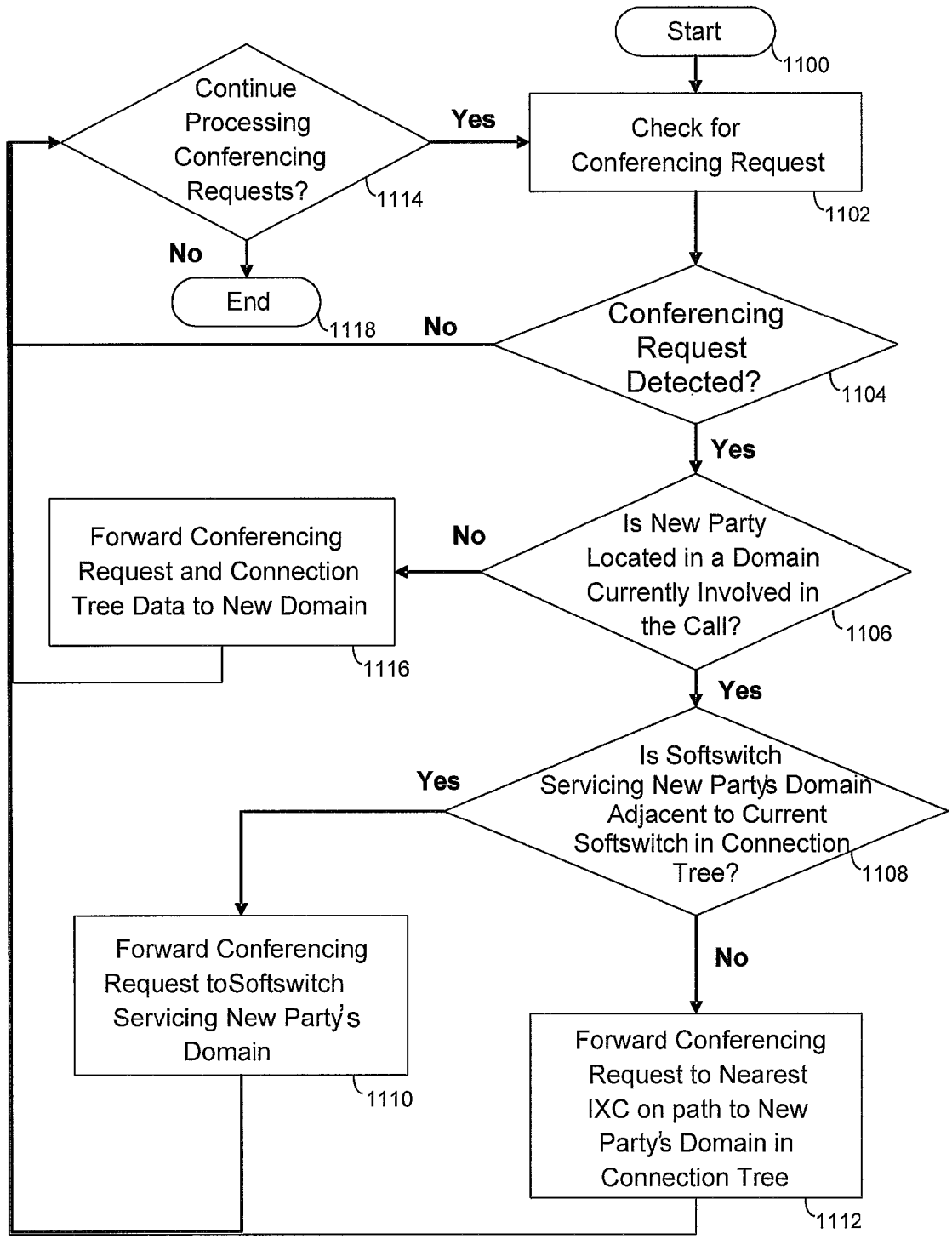
FIG. 11 is a flowchart depicting a method of operation for a softswitch in an interexchange carrier domain, according to an embodiment of the present invention.

FIG. 11 is a flowchart showing a method of operation for an interexchange carrier softswitch involved in a conference call, according to the present invention. The method begins at block 1100 and proceeds to block 1102 where the IEX softswitch checks for incoming conferencing requests. If a conferencing request is detected at decision block 1104 processing continues to decision block 1106. At block 1106, the domain of the new party is checked to see if it is a domain currently involved in the call. If the domain is involved in the call, operation the method proceeds to decision block 1108. If the new party's domain is not involved in the call, the method proceeds to block 1116 where the conferencing request and the connection tree information is forwarded to the new party's domain. From there operation proceeds to decision block 1114. At block 1108, the connection tree is checked to see if the new party's domain is adjacent to the current domain/softswitch in that tree. If the new party's domain is adjacent to the current domain/softswitch, processing continues to block 1110 where the conferencing request is forwarded to the softswitch serving the new party's domain. From there, the method proceeds to decision block 1114. If the new party's domain is not adjacent to the current softswitch in the connection tree, the conferencing request is forwarded to the nearest softswitch in an interexchange carrier domain in the current call that is located on the path to the new party's domain in the connection tree, as indicated by block 1112. From there processing continues to block 1114.

At block 1114, a check is performed to determine if the softswitch should continue to process conferencing requests. If not, the method ends at terminator block 1118. If processing should continue, the method proceeds back to block 1102.

The present invention has been illustrated in relation to a particular embodiment which is intended in all respects to be illustrative rather than restrictive. Those skilled in the art will recognize that the present invention is capable of many modifications and variations without departing from the scope of the invention. Those skilled in the art will also appreciate that the invention described represents only one example of the various configurations that will be suitable for implementation of the various embodiments of the invention.

It must be emphasized that the law does not require and it is economically prohibitive to illustrate and teach every possible embodiment of the present claims. Hence, the above-described embodiments are merely exemplary illustrations of implementations set forth for a clear understanding of the principles of the invention. Many variations and modifications may be made to the above-described embodiments without departing from the scope of the claims. All such modifications, combinations, and variations are included herein by the scope of this disclosure and the following claims.

What is claimed is:

1. A softswitch for processing voice over internet protocol conference calls, the softswitch comprising:
    a processor; and
    a computer readable memory having stored thereon instructions, wherein the instructions, when executed by the processor, cause the processor to perform:
        storing active call information in the memory, the active call information including a connection table identifying various call nodes, a domain corresponding to each call node, any parties connected to each node, and nodes that are connected to each of the nodes, wherein the connection table includes a plurality of connection trees, each connection tree corresponding to one of a plurality of calls, wherein each connection tree includes an identifier for a corresponding call, a domain name for the call, information indicating users within the same domain that are connected to the call, and a domain name for at least one interexchange carrier softswitch associated with the call;
        responsive to a conferencing request for an additional party to join an existing call, reading the connection table, including the connection trees;
        determining whether the an additional party is located within a domain of the existing call, served by the softswitch, based on a connection tree associated with the existing call;
        responsive to determining that the additional party is located within the domain of the existing call, served by the softswitch, sending an invitation to join the existing call to the additional party from the softswitch and broadcasting an updated connection tree to another softswitch involved in the existing call; and
        responsive to determining that that the additional party is not located in the domain of the existing call, served by the softswitch, forwarding the conferencing request to a nearest interexchange carrier softswitch identified in the connection tree associated with the existing call,
            wherein responsive to receiving the conferencing request, the nearest interexchange carrier softswitch determines whether the additional party is located in another domain that is involved in the existing call;
            wherein upon determining that the additional party is located in another domain that is currently involved in the call, the nearest interexchange carrier softswitch determines whether the domain in which the additional party is located is adjacent to the domain served by the softswitch based on the connection tree associated with the existing call; and
            wherein upon determining that the additional party is not located within another domain involved in the existing call, the interexchange carrier softswitch forwards the conferencing request and the connection tree associated with the existing call to another softswitch serving the domain in which the additional party is located.

2. The softswitch of claim 1, wherein the connection table includes call information for a second call having a second call identifier.

3. The softswitch of claim 1, wherein the invitation for the additional party to join an existing call comprises a session initiation protocol INVITE request.

4. The softswitch of claim 1, wherein the instructions further cause the processor to update the connection table upon a new party joining the conference call.

5. The softswitch of claim 1, wherein responsive to determining that the domain in which the additional party is located is not adjacent to the domain served by the softswitch, the interexchange carrier softswitch forwards the conferencing request to a nearest other interexchange carrier softswitch on a path to the domain in which the additional party is located.

6. The softswitch of claim 1, wherein responsive to determining that that the domain in which the additional party is located is adjacent to the domain served by the softswitch, the interexchange carrier softswitch forwards the conferencing request to another softswitch serving the domain in which the additional party is located.

7. A system for providing voice over internet protocol conference calls, the system comprising:
    a first softswitch having a table stored in a computer readable memory for tracking active calls being serviced by the first softswitch, the first table identifying various call nodes, a domain corresponding to each call node, any parties connected to each node, and nodes that are connected to each of the nodes, wherein the table includes a plurality of connection trees, each connection tree corresponding to one of a plurality of calls, wherein each connection tree includes an identifier for a corresponding call, a domain name for the call, information indicating users within the same domain that are connected to the call, and a domain name for at least one interexchange carrier softswitch associated with the call; and
    a second softswitch communicatively connected to the first softswitch, wherein the second softswitch is a nearest interexchange carrier identified in a connection tree associated with an existing call;
    wherein the first softswitch is configured to perform:
        responsive to a conferencing request for an additional party to join an existing call, reading the first connection table, including the connection trees;
        determining whether the additional party is located within in a domain of the existing call, served by the first softswitch, based on a connection tree associated with the existing call;
        responsive to determining that the additional party is located within the domain of the existing call, served by the first softswitch, sending an invitation to join the existing call to the additional party from the first softswitch and broadcasting an updated connection tree to another softswitch involved in the existing call; and
        responsive to determining that that the additional party is not located in the domain of the existing call, served by the first softswitch, forwarding the conferencing request to the second softswitch,
wherein responsive to receiving the conferencing request, the second softswitch determines whether the additional party is located in another domain that is involved in the existing call;
wherein upon determining that the additional party is located in another domain that is currently involved in the call, the second softswitch determines whether the domain in which the additional party is located is adjacent to the domain served by the first softswitch based on the connection tree associated with the existing call; and
wherein upon determining that the additional party is not located within another domain involved in the existing call, the second softswitch forwards the conferencing request and the connection tree associated with the existing call to another softswitch serving the domain in which the additional party is located.

8. The system of claim 7, wherein responsive to determining that the domain in which the additional party is located is not adjacent to the domain served by the first softswitch, the second softswitch forwards the conferencing request to a nearest other interexchange carrier softswitch on a path to the domain in which the additional party is located.

9. The system of claim 7, wherein responsive to determining that that the domain in which the additional party is located is adjacent to the domain served by the first softswitch, the second softswitch forwards the conferencing request to a third softswitch serving the domain in which the additional party is located.

10. A method for providing voice over internet protocol conference calls, the method comprising:
storing active call information in a computer readable memory, the call information corresponding to an active call being serviced by a first softswitch, wherein the active call information comprises a connection table, the connection table identifying various call nodes, a domain corresponding to each call node, any parties connected to each node, and nodes that are connected to each of the nodes, wherein the connection table includes a plurality of connection trees, each connection tree corresponding to one of a plurality of calls, wherein each connection tree includes an identifier for a corresponding call, a domain name for the call, information indicating users within the same domain that are connected to the call, and a domain name for at least one interexchange carrier softswitch associated with the call;
responsive to a conferencing request for an additional party to join an existing call, reading the connection table, including the connection trees;
determining whether the additional party is located within a domain of the existing call, served by the softswitch, based on a connection tree associated with the existing call;
responsive to determining that the additional party is located within the domain of the existing call, served by the softswitch, sending an invitation to join the existing call to the additional party from the softswitch and broadcasting an updated connection tree to another softswitch involved in the existing call; and
responsive to determining that that the additional party is not located in the domain of the existing call, served by the softswitch, forwarding the conferencing request to a nearest interexchange carrier softswitch identified in the connection tree associated with the existing call,
wherein responsive to receiving the conferencing request, the nearest interexchange carrier softswitch determines whether the additional party is located in another domain that is involved in the existing call;
wherein upon determining that the additional party is located in another domain that is currently involved in the call, the nearest interexchange carrier softswitch determines whether the domain in which the additional party is located is adjacent to the domain served by the softswitch based on the connection tree associated with the existing call; and
wherein upon determining that the additional party is not located within another domain involved in the existing call, the interexchange carrier softswitch forwards the conferencing request and the connection tree associated with the existing call to another softswitch serving the domain in which the additional party is located.

11. The method of claim 10, wherein responsive to determining that the domain in which the additional party is located is not adjacent to the domain served by the softswitch, the interexchange carrier softswitch forwards the conferencing request to a nearest other interexchange carrier softswitch on a path to the domain in which the additional party is located.

12. The method of claim 10, wherein responsive to determining that that the domain in which the additional party is located is adjacent to the domain served by the softswitch, the interexchange carrier softswitch forwards the conferencing request to another softswitch serving the domain in which the additional party is located.

* * * * *